United States Patent [19]

Wier

[11] Patent Number: 4,621,783
[45] Date of Patent: Nov. 11, 1986

[54] FASTENING AND A FASTENER MEMBER

[76] Inventor: Jan H. Wier, Burleigh, Bulls, New Zealand

[21] Appl. No.: 596,400

[22] Filed: Apr. 3, 1984

[30] Foreign Application Priority Data

Apr. 11, 1983 [NZ] New Zealand .......................... 203841
Jun. 15, 1983 [NZ] New Zealand .......................... 204602

[51] Int. Cl.$^4$ ............................................. A47G 29/02
[52] U.S. Cl. ................................... 248/245; 248/125;
248/545; 256/49
[58] Field of Search ............ 248/412, 245, 337, 295.1,
248/354.4, 354.1, 188.5, 125, 545; 256/DIG. 5,
19, 2, 53, 49, 50, 10; 174/158 F, 161 F, 163 F,
45 R

[56] References Cited

U.S. PATENT DOCUMENTS

| | | | |
|---|---|---|---|
| 689,855 | 12/1901 | Copeland | 248/412 X |
| 3,457,358 | 7/1969 | Brumfield | 256/10 X |
| 3,669,413 | 6/1972 | Laible | 256/50 X |
| 3,913,888 | 10/1975 | Maranell | 256/10 |
| 4,077,611 | 3/1978 | Wilson | 256/10 |
| 4,171,523 | 10/1979 | Parkitny | 256/10 X |
| 4,234,151 | 11/1980 | John | 248/412 X |
| 4,266,757 | 5/1981 | Kirkwood | 256/49 X |
| 4,470,579 | 9/1984 | Aho | 256/19 X |

Primary Examiner—J. Franklin Foss
Attorney, Agent, or Firm—Holman & Stern

[57] ABSTRACT

The fastener of the invention as described in the specification includes a first or inner sleeve of plastic material including a bore corresponding to the outer diameter of the elongate member. The body of the inner sleeve is relatively thin and includes a taper throughout its length. An outer sleeve is provided and includes an inner bore of a complimentary taper to the outer surface of the inner sleeve. The outer sleeve is positioned over and moved in a direction opposite to the apices of the tapered surfaces of the inner and outer sleeves so that the inner sleeve and the outer sleeve are respectively wedged into frictional engagement and location on the elongate member and the inner sleeve. In preferred embodiments, a variety of integrally formed engaging members may be provided on the outer sleeve member to provide for fence wire connection, foot pegs (for fencing purposes) or shelving brackets. A combination of a fiberglass fence post including at least one fastener, and a foot peg member are shown herein is also claimed.

10 Claims, 4 Drawing Figures

FASTENING AND A FASTENER MEMBER

BACKGROUND OF THE INVENTION

This invention concerns a method of removeably engaging a fastener member on an elongate member. The invention also includes a new fastener member, and more particularly a fastener member which is suitable for although not limited to applications where it is desired to locate a fastener member in position on or along the length of a substantially round elongate post support or frame member.

It is known to provide fastener members or connectors which are adapted for use in conjunction with a wide variety of purposes including fencing, shop fittings, framing, shelving lattice work and the like. In such applications, it has been known to provide an elongate support or post of a substantially round cross-section, and of pultruded fibreglass, plastics, or polished or stainless steel aluminium construction. These materials generally include a smooth surface.

It has however been found that there is a difficulty in manufacturing a fastener of a simple design, preferably in economical plastics materials which is able to be fastened on to an elongate round post or support which has this type of smooth surface without damage to the post, and which still permits for ready height adjustment and removal of the connector from the post as and when required. Furthermore, it has been found that methods of fastening and fastener members have been of complicated design and construction in relation to different purposes such as providing connectors for electrified fences, support members, framing, or alternatively for shop shelving and fittings. The provision of a fastener according to this invention envisages use of plastic materials in the fastener member so that the moulds can readily be changed to provide fasteners for a variety of these types of purposes.

SUMMARY OF THE INVENTION

It is therefore an object of this invention to provide a method of removeably engaging a fastener member to an elongate member, and a fastener member, which goes at least some way to overcoming the disadvantages which have been found in relation to methods of fastening and fastener members as are known in the art. The inventions also provides an improved fastener member (according to preferred embodiments) for use as a fence connector or a shelving bracket with fence posts or framing of a generally round cross-section and including a smooth surface. Other objects and advantages of this invention will become apparent from the following description. It is also an object of the invention to provide a fastener member manufactured in plastics materials which is of a simple yet efficient design, and which may be economically mass produced, and which provides the public with a useful choice.

According to a first aspect of this invention there is provided a fastener member including a first or inner sleeve of plastics material including a bore through its longitudinal axis of a substantially rounded cross-section corresponding to that of an elongate member upon which the fastener member is to be located, the body of said first or inner sleeve being relatively thin and the outer surface of the said inner sleeve being tapered throughout its length at an angle relative to the longitudinal axis of said inner sleeve, and with at least one longitudinal slit through and extending substantially along the length of the inner sleeve; and a second or outer sleeve including a bore through its longitudinal axis having a taper substantially complementary to that of the outer surface of the inner sleeve; the arrangement being such that said inner sleeve is positioned on said elongate member and said outer sleeve is positioned over and moved in a direction opposite to the apices of the tapered surfaces of the sleeve so that the inner sleeve and the outer sleeve are respectively wedged into frictional engagement and location on the elongate member and the inner sleeve.

According to a further aspect of this invention there is provided a method of locating a fastener member on an elongate member of substantially round cross-section, said fastener member including a first or inner sleeve of plastics material including a bore through its longitudinal axis of a cross-section corresponding to the elongate member, the body of said inner sleeve being relatively thin and the outer surface of the sleeve being tapered throughout its length at an angle relative to the longitudinal axis of said inner sleeve, and with at least one longitudinal slit through and extending substantially along the length of the inner sleeve; and a second or outer sleeve including a bore through its longitudinal axis with a taper substantially complementary to that of the outer surface of the inner sleeve; the method of the invention being that said inner sleeve is positioned on said elongate member and said outer sleeve is positioned over and moved in a direction opposite to the apices of the tapered surfaces of the sleeves so that the inner sleeve and the outer sleeve are respectively wedged into frictional engagement and location on the elongate member and the inner sleeve.

In preferred embodiments, the method of the invention may provide that the movement of the outer sleeve over the inner sleeve is a rotational movement in a direction opposite to the apices of the tapered surfaces of the sleeves to effect frictional engagement and location of the fastener member on the elongate member, with removable engagement of the fastener member being possible by reversing the rotation and movement of the outer sleeve.

In one preferred embodiments, the fastener apparatus of the invention may be provided as a fence connector including an engaging means integrally formed with the outer body portion of the outer sleeve and adapted to receive a fence wire. In further alternative embodiments, the fastener member may include a bracket shelf or support member or portion integrally formed with engageable to the outer surface of the outer sleeve member.

BRIEF DESCRIPTION OF THE DRAWINGS

The invention, which should be considered in all its novel aspects, will now be described by way of example only, and with reference to preferred embodiments as disclosed in the drawings and in which.

DETAILED DESCRIPTION OF THE INVENTION

Figure 1:
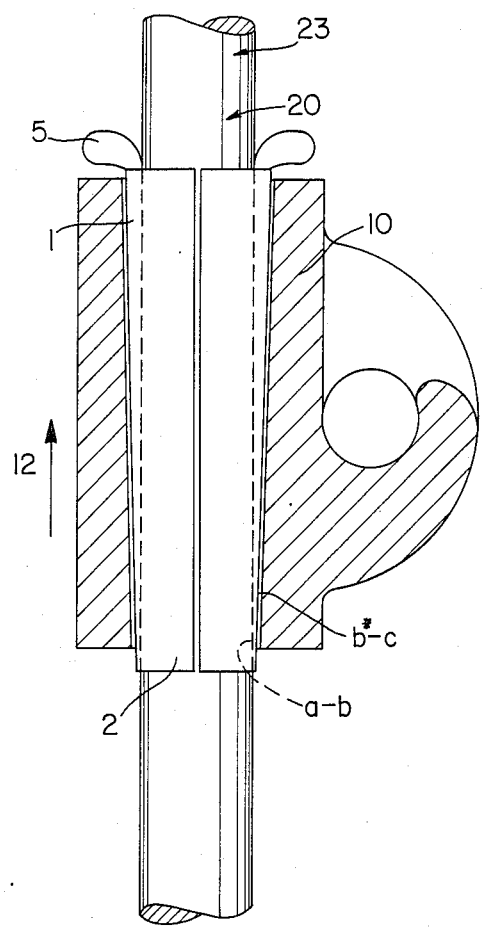
FIG. 1 is a part cut away and exploded view of a fastener member according to one preferred embodiment of the invention, and when used as an electric fence connector.

The fastener according to the present invention has particular use in relation to its connection to any elongate member being a substantially round post or support member—preferably of a diameter of less than 50 mm (or in preferred examples say 5 mm to 25 mm). In one preferred form of the invention the fastener will be used in conjunction with lightweight, transportable fibreglass or plastic fence posts which have one particular application in relation to electrified temporary (or "break") fencing. In other embodiments and applications of the invention it is envisaged that the fasteners could be used upon tubular stainless or polished steel-/aluminium support members for shelving or framing where it is desirable to removably engage and locate a fastener on a relatively smooth surfaced substantially round support member, without damage to the support member itself.

The invention therefore provides a fastener which is able to be positioned on an elongate member and located (manually) at any convenient position and which enables other features to be integrally formed with or attached to the fastener to provide a variety of uses. The invention will be described with particular reference to the preferred embodiments as shown in the drawings, in which the fastener provides a fence connector comprised of an inner sleeve member generally indicated by arrow 1 and an outer sleeve member generally indicated by arrow 10. The fastener of the invention is adapted to be positioned on an elongate member such as a post or support member generally indicated by arrow 20 which may be any suitable post or support member of say for example, pultruded fibreglass, plastics (tubular) stainless or polished steel-aluminium construction, or other material preferably with a generally smooth finished surface. (i.e. having a low co-efficient of friction).

In the preferred embodiment, the first or inner sleeve is an elongate plastics member including an axial bore of a diameter corresponding to the diameter of the post or support member on which the connector is to be fitted. The inner wall (b) of the inner the inner sleeve member is thus adapted to make some frictional adhesion to the surface of the post (a) because of the natural pre-tension of the inner sleeve. The outer surface of the inner sleeve member (b*) is provided with a preferably constant taper throughout its length from one end to the other at an (included) angle of approximately 2 degrees but up to say 7 degrees relative to the longitudinal axis of the inner sleeve. The preferable inclination of the outer surface of the inner surface is approximately 1:50. The arrangement is therefore such that the inner sleeve member 1 is provided as a finely tapered wedge means which has some natural frictional contact with the surface of the elongate member upon which it is placed, i.e. interface (a-b) in the drawings interface.

The inner sleeve member 1 is preferably formed in a slightly pliable plastics material having some natural resilience includes an elongate slit and/or slits for extending through the sleeve and preferably throughout the length thereof. The slit and the pliable and resilient nature of the plastics material enables the outer sleeve member to compress the inner sleeve member into firm frictional engagement with the surface of the elongate member (in a manner to be described). In one preferred embodiment where the fastener member is to be used on a fence post being a pultruded fibreglass rod, the inner sleeve may preferably be provided in glass reinforced nylon, or similar plastics material. Alternative materials may be provided depending upon the type of elongate member upon which the fastener member is to be located, and the relative co-efficients of friction of between the surfaces of the materials (interface (a-b)).

It is considered that the material in which the inner sleeve is provided will depend upon the co-efficient of friction of the surface of the support or post member. It is furthermore considered to be a fundamental principle of the invention that the ratio of the co-efficient of friction between the inner and outer sleeves (i.e. the outer interface ((b-c) in FIG. 1) should be very slightly less than the co-efficient of friction between the post and the inner surface of the inner sleeve (i.e. the inner interface ((a-b) in FIG. 1).

This requirement is less critical if a head portion 5 is provided on the inner sleeve as shown in FIG. 1 of the drawings. The head portion is able to be manually gripped while the outer sleeve of the fastener is rotatably moved to lock the fastener assembly onto the support member. The providing of the head portion 5 enables the same plastics material to be used for both the inner and outer sleeve members. This has significant benefits for materials costs and manufacturing purposes. Furthermore, it overcomes the need to change the frictional co-efficient of the surfaces of the materials (by treating one surface for example) when the same material is used for both the inner and outer sleeve members.

The outer sleeve member 10 may preferably be comprised of a similar plastics material to the inner sleeve member, although it is generally provided of a greater thickness for strength. In alternative embodiments, the preferred plastics material may be glass reinforced nylon material (or possibly acetal or polyester material). In one pfeferred combination when in use as a fence connector on pultruded fibreglass posts, both the inner sleeve member and outer sleeve member will be provided in glass reinforced nylon materials, with the head portion 5 being manually gripped to overcome any unfavourable ratio between the co-efficients of friction between the interfaces ((a-b) and (b*-c)).

The inner surface (c) of the outer sleeve member 10 is provided with a taper substantially corresponding to the outer surface (b*) of the inner sleeve member 1. The arrangement is such that the outer sleeve member 10 may be positioned over the apex portion 2 of the inner sleeve member 1 so that the sleeve members may be slid as a fastener member assembly on to an elongate member and positioned where required thereon. The outer sleeve member 10 may then be moved in the direction indicated by arrow 12 so that it is moved along the tapered surface (b*) of the inner sleeve member. This movement of the outer sleeve member 10 relative to the inner sleeve member tends to compress the inner sleeve member onto the elongate member (post) and the outer sleeve member onto the inner sleeve member so as to lock the fastener assembly together. The longitudinal movement to lock the assembly together is preferably a rotational movement in the direction of arrow 12, with reverse rotations and movement being used to disengage the fastener.

The most common loading of fasteners used for fence posts, or as a bracket a support member for a shelf assembly is a longitudinal load exerted on the fastener member in parallel with length of the elongate post or support member. Therefore, in preferred embodiments, the arrangement of the fastener member will be that the apex of the angled surface of the fasteners is directed away from the proposed longitudinal loading on the fastener. That is, the connector is positioned on the elongate member (post) so that the longitudinal load to be exerted on the fastener is in the same direction as the direction in which the outer sleeve member is moved to lock the fastener in position on the post or support member.

Figure 2:
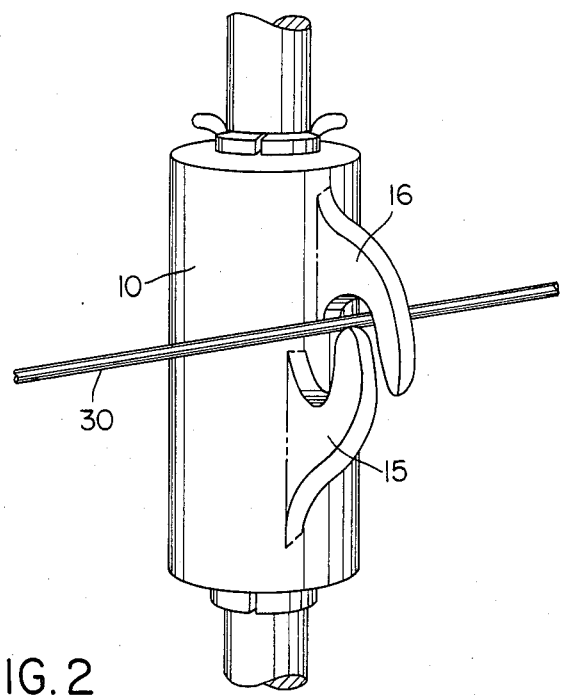
FIG. 2 is a perspective view of the fastener according to that shown in FIG. 1 of the drawings when in use as a fence connector.
Figure 3:
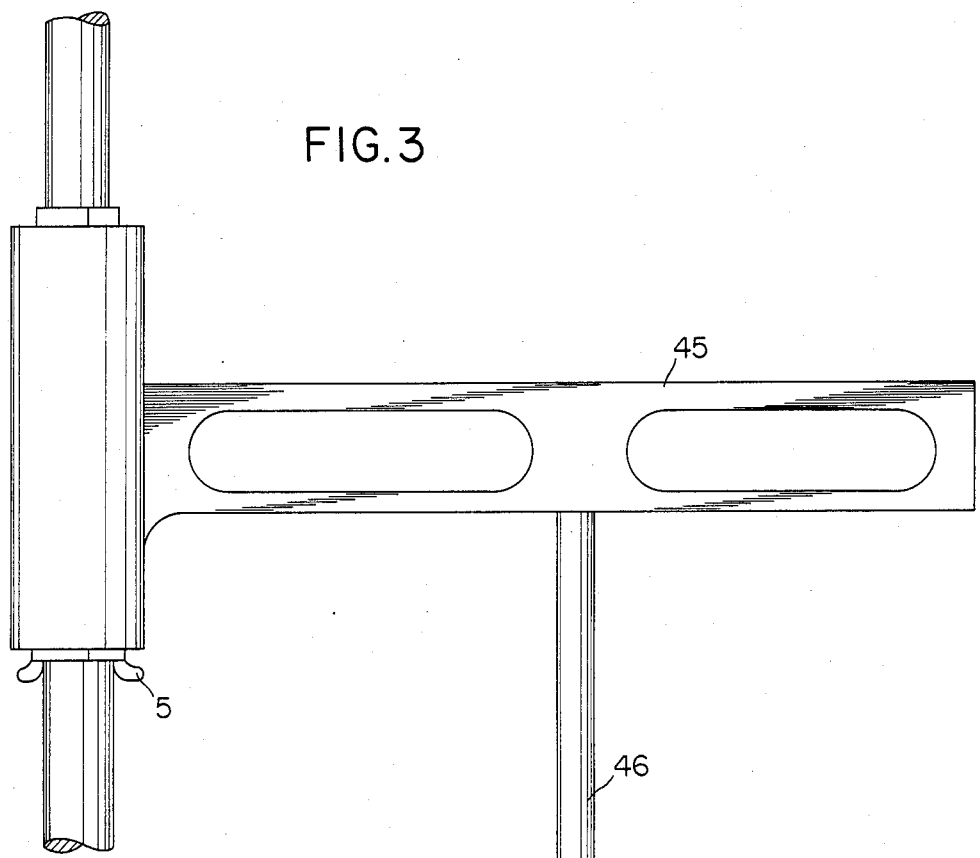
FIG. 3 is a perspective view of a fastener when in use as a foot peg member upon a fence post.
Figure 4:
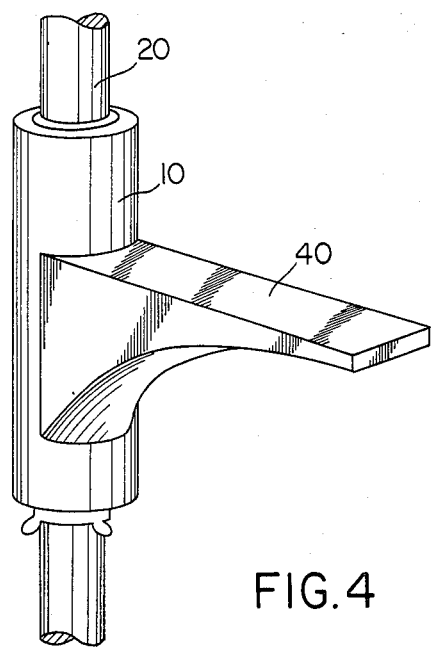
FIG. 4 is perspective view of a fastener when in use as a shelf support bracket in one possible application of the invention.

Therefore, in one embodiment where the fastener is used as a connector for a fence post, the apex of the tapers of the inner and outer sleeves will be faced downwardly along the fence posts (FIG. 2) so that the longitudinal loading which is exerted in a direction up the post (arrow 12) (by a side loading on the fence wire) causes the connector to be more securely fastened and not to be disengaged from its engagement on the fence post. Similarly, where the fastener member is to be used as a support bracket for a shelf, the longitudinal load will be in a downward direction relative to the standing post or support member, so that the apex of the fastener member will be pointed upwardly (as shown in FIGS. 3 and 4) being the inverse of its use as a fence connector.

The arrangement of the substantially complementary tapered surfaces between the inner and outer sleeve members provides for a tapered collet type self-locking arrangement so that the larger the longitudinal load exerted along the elongate member (post of shelf frame) then the tighter the grip of the fastener. Furthermore, this grip applies only in one direction so that the fastener may be readily unlocked by rotational (or "corkscrew" type) movement in a direction opposite to the longitudinal loading direction indicated by arrow 12 in the preferred embodiment (or the opposite direction in FIGS. 3 and 4).

As a possible additional feature, the inner sleeve may be provided with a pair of outwardly extending lugs which are adapted to extend through shaped apertures provided in the outer sleeve. In this arrangement, the outer sleeve could be rotatably moved along and about the inner sleeve so that the aperture provided in the outer sleeve would move relative to the lugs on the inner sleeve between an unlocked and a locked position. The inner sleeve could be press fitted within the outer sleeve, and the lug and aperture arrangement would provide a visual indication as to whether the connector was locked or unlocked in position on the fence post.

Alternatively both the inner and outer sleeves could be provided with complementary shaped tapered surfaces and a screw thread by which the outer sleeve could be locked over and in relation to the inner sleeve. However both of these alternatives are considered to have possible disadvantages since they would be more difficult to manufacture, and may possibly be less suitable for quick and accurate positioning of the fastener on the elongate member (post).

Therefore, the invention in preferred embodiments provides a fastener of a simple design which is cheap to manufacture by mass produced injection moulding techniques and which provides a fastener assembly which is readily engaged in appropriate position and disengaged from suitable elongate member posts or support members on which it is designed to be located. The invention enables a wide variety of ancilliary members which may be of any suitable shape to be integrally provided on the surface of the outer sleeve member 10.

In one preferred embodiment the fastener member is used as a fence connector. A suitable engaging means may be provided which is adapted to enclose the wire in the connector, so that the wire is retained in position upon (and relative to) the post, with the wire not being prevented from being moved along its length. In one such embodiment as shown in FIG. 2 of the drawings this type of engaging means may be provided as a plurality of outwardly extending arm members with the outer end of arm member 15 depending in one direction, and the outer end of arm member 16 depending in the other direction so as to provide overlapping arms. This configuration (which is known in the art), enables the wire to be passed about the outer end of arm members 15 and 16 and to be positioned in the elongate aperture provided beneath the pair of outwardly extending arm members. The wire 30 is then positioned in the fastener in the manner shown in FIG. 2 of the drawings so that the wire is enclosed in the overlapping members and is therefore retained in the connector, but (the wire) is not constrained against movement along its length.

In a further embodiment for use in fencing systems (as shown in FIG. 3) the fastener includes an outwardly extending bracket formed to include a downwardly depending peg 46. This arrangement provides for a foot peg type fitting 45 positioned adjacent to the base of a fence post 20 so that the outwardly depending portion would provide a step for convenient tredding of the fence post in to the ground. It is considered that this embodiment will provide an important combination fence post product in the market. The combination will include a fibreglass pultrusion fence post (as shown in the drawings), one or more fasteners of this invention (as shown in FIG. 2) and the step in foot peg as shown in FIG. 3. Such a combination will have very significant application for efficient erection of temporary electrified fencing systems.

In an alternative embodiment as shown (by way of example) in FIG. 4 the outer sleeve of the fastener member may be provided with an outwardly extending bracket member 40 adapted to provide a shelf support, so the apparatus may be used in a shelving system. Alternatively, different types of engaging means may be provided to that shown in FIGS. 2 and 4 of the drawings, and which would be adapted to receive trellis work or steel frame members to provide a frame, lattice or reinforcing system.

It will be appreciated that a variety of different types of engaging means, brackets or other features may be provided either integrally formed or adapted to fit onto the outer sleeve of the fastener member of the invention depending upon the desired use.

The invention therefore provides a fastener which is particularly suitable for use in relation to the securing of a fastener of the type disclosed in the invention to a substantially elongate member of a generally round cross-section and particularly to materials having a smooth surface. The invention provides for substantial grip of the fastener member on the post or support member when longitudinal force is exerted in one direction, with rotational and longitudinal ("corkscrew") movement in the other direction being possible to disengage the fastener for re-engagement in another position on the elongate post or support member, or for removal therefrom.

Finally, it will be appreciated that the invention has been described by way of example only, and that modifications alterations and additions may be made to the invention without departing from the scope thereof.

What is claimed is:

1. A fastener comprising: a first, inner sleeve of plastics material having a body and apices, and including a bore through its longitudinal axis of a substantially annular cross-section corresponding to an outer surface of an elongate member upon which the fastener member is to be located, said body of said first, inner sleeve member having a relatively thin wall, and an outer surface of said inner sleeve being tapered throughout its axial length at an angle relative to a longitudinal axis of said inner sleeve; said body having at least one longitudinal slit through said wall and extending substantially along the axial length of said inner sleeve; and a second, outer sleeve having a longitudinal axis and an inner surface, and its longitudinal axis, said inner surface having a taper substantially complementary to that of said outer surface of said inner sleeve; and wherein the ratio of the co-efficient of friction between the elongate member and the inner surface of said inner sleeve at least slightly exceeds the co-efficient of friction between said outer surface of said inner sleeve and said inner surface of said outer sleeve; said inner sleeve being positionable on said elongate member and said outer sleeve being positionable over by movement in a direction opposite to said apices of of said inner sleeve so that said inner sleeve and said outer sleeve are respectively wedged into frictional engagement and location on the elongate member and said inner sleeve.

2. A fastener member as claimed in claim 1 wherein the ratio of the co-efficient of friction between the elongate member and said inner surface of said inner sleeve, together forming an inner interface, marginally exceeds the co-efficient of friction between said outer surface of said inner sleeve and said inner surface of said outer sleeve, together forming an outer interface.

3. A fastener member as claimed in claim 1 wherein a head portion is provided on inner sleeve on an opposite end relative to an apex of said inner sleeve which is adapted to be manually gripped while said outer sleeve is moved to lock the fastener assembly support member so that the co-efficient of friction of said inner interface exceeds that of said outer interface.

4. A fastener member as claimed in claim 1 wherein said outer sleeve includes an engaging means integrally formed with said outer body portion of said outer sleeve, which is adapted to receive a fence wire.

5. A fastener member as claimed in claim 1 wherein said outer sleeve includes an outwardly extending arm member integrally formed to include a downwardly depending peg, to provide a foot peg member for an elongate member which is a fence post.

6. A fastener member as claimed in claim 1 wherein the outer sleeve includes an outwardly extending arm member which provides a shelf for support bracket when the fastener member is used on an upstanding elongate member in a shelving system.

7. A fastener member as claimed in claim 1 wherein said inclination of the outer surface of said inner sleeve to said inner surface of said inner sleeve is an included angle of up to 7 degrees.

8. A fastener member as claimed in claim 3 adapted for use with an elongate member which is a fibreglass post and wherein said inner and outer sleeves are both provided in glass reinforced nylon material.

9. A fastener member as claimed in claim 2 adapted for use with an elongate member which is a fibreglass post and wherein said inner sleeve is provided in glass reinforced nylon material an acetyl or polyester material, and said outer sleeve is provided in acetal.

10. In combination, an elongate support member and two fastener members, comprising: an elongate support member being a fiberglass post and at least two fastener members each including a first, inner sleeve of plastics material including a bore through a longitudinal axis thereof, said inner sleeve having a substantially rounded cross-section corresponding to an outer surface of said elongate member, said inner sleeve having a relatively thin wall; an outer surface of said inner sleeve being tapered throughout its length at an angle relative to a longitudinal axis of said inner sleeve, with at least one longitudinal slit through and extending substantially along the length of said inner sleeve; and a second, outer sleeve including a bore through its longitudinal axis having a taper substantially complementary to that of said outer surface of said inner sleeve, said first fastener member including an engaging means adapted to receive a fence wire, and at least said second fastener member having an outwardly extending arm member adapted to provide a foot peg positioned adjacent to one end of said elongate member, and wherein said at least two fastener members are removeably engageable upon elongate support member.

* * * * *